United States Patent [19]
Locker et al.

[11] Patent Number: 5,429,779
[45] Date of Patent: Jul. 4, 1995

[54] METHOD OF MAKING CORDIERITE BODIES

[75] Inventors: Robert J. Locker, Corning; Constance B. Sawyer, Lindley, both of N.Y.

[73] Assignee: Corning Incorporated, Corning, N.Y.

[21] Appl. No.: 180,436

[22] Filed: Jan. 12, 1994

Related U.S. Application Data

[63] Continuation of Ser. No. 979,801, Nov. 20, 1992, abandoned.

[51] Int. Cl.⁶ .................. C04B 35/04; C04B 35/10
[52] U.S. Cl. .................. 264/40.1; 264/63; 501/119
[58] Field of Search .......... 264/40.1, 63; 501/119

[56] References Cited

U.S. PATENT DOCUMENTS

| | | | |
|---|---|---|---|
| 3,112,184 | 11/1963 | Hollenbach | 264/63 |
| 3,790,654 | 2/1974 | Bagley | 264/177 |
| 3,885,977 | 5/1975 | Lachman | 501/119 |
| 3,950,175 | 4/1976 | Lachman et al. | |
| 4,001,028 | 1/1977 | Frost et al. | |
| 4,280,845 | 7/1981 | Matsuhisa et al. | |
| 4,329,162 | 5/1982 | Pitcher | 55/523 |
| 4,415,344 | 11/1983 | Frost | 55/523 |
| 4,421,699 | 12/1983 | Inoguchi et al. | |
| 4,434,117 | 2/1984 | Inoguchi et al. | |
| 4,772,580 | 9/1988 | Hamanaka et al. | |
| 5,030,398 | 7/1991 | Hamanaka | 264/63 |
| 5,114,644 | 5/1992 | Beall et al. | 264/63 |

FOREIGN PATENT DOCUMENTS 0201319 11/1986 European Pat. Off. .
0278749 8/1988 European Pat. Off. .
0354721 2/1990 European Pat. Off. .

*Primary Examiner*—James Derrington
*Attorney, Agent, or Firm*—Michael L. Goldman; Kees van der Sterre

[57] ABSTRACT

In a process of forming cordierite-containing bodies, the water absorption capability or shrinkage of the bodies is controlled using the alumina-yielding ingredients. The process of controlling the water absorption capability or shrinkage includes the steps of providing alumina-yielding ingredients in the form of two aluminas having different particle sizes, wherein the ratio of the two particle sizes is in the range of from about 3:1 to 30:1 or 1:3 to 1:30. Next, a linear relationship between the cordierite-containing body's water absorption capability or shrinkage and the relative percentage of the alumina-yielding ingredients made up by the two aluminas is determined. After determining the linear relationship, a water absorption capability or shrinkage of the cordierite-containing body is selected in accordance with that relationship by adjusting the relative percentages of the two aluminas.

22 Claims, 2 Drawing Sheets

METHOD OF MAKING CORDIERITE BODIES

CROSS REFERENCE TO RELATED APPLICATION:

This is a continuation of application No. 07/979,801 filed Nov. 20, 1992, now abandoned.

FIELD OF THE INVENTION

The present invention relates to a method of making cordierite-containing bodies. More particularly, the present invention relates to a method of controlling water absorption and/or shrinkage in cordierite-containing bodies.

BACKGROUND OF THE INVENTION

Automobile exhaust gases are conventionally purified with a catalyst supported on a ceramic body able to withstand high temperatures. The preferred catalyst support structure is a honeycomb configuration which includes a multiplicity of unobstructed parallel channels sized to permit gas flow and bounded by thin ceramic walls. The channels can have any configuration and dimensions provided gases can freely pass through them without being plugged by entrained particulate material. Examples of such preferred structures include the thin-walled ceramic honeycomb structures described in U.S. Pat. Nos. 3,790,654 to Bagley and 3,112,184 to Hollenbach.

Generally similar ceramic structures are used as diesel engine particulate filters. In such applications, ceramic honeycomb filters are fitted to diesel engine exhaust systems for removal of particulates from the high temperature diesel engine exhaust gases. Examples of diesel engine particulate filters are disclosed in U.S. Pat. Nos. 4,329,162 to Pitcher, Jr. and 4,415,344 to Frost et al. Again, the ceramic materials utilized in such applications must have a high thermal shock resistance and a low coefficient of thermal expansion.

Cordierite ($2MgO.2Al_2O_2.5SiO_2$) is known to display a very low thermal expansion over a wide range of temperatures. In substantial amounts, cordierite gives a ceramic body excellent thermal shock resistance when subjected to rapid and severe changes in temperatures. This property has caused cordierite to find widespread use as a catalyst support for automotive catalytic converters and as diesel engine particulate filters.

Typically, when used as a catalytic converter substrate, the cordierite body is treated with a high surface area alumina washcoat in the form of a slurry of suspended alumina. The alumina washcoat serves as a support for the later-applied catalyst material. The washcoat is applied, for example, by submersing the cordierite substrate in or passing the substrate through a stream of the alumina slurry. The amount of alumina coating deposited on the surface of the substrate is directly proportional to the substrate's ability to absorb water. The amount of alumina deposited, in turn, has a direct effect on the amount of catalyst that will eventually be deposited on the substrate. Catalyst materials coated on converter substrates are typically very expensive. Automobile manufacturers often require varying levels of water absorption depending on the particular catalytic converter and the level of performance required. This enables the automobile manufacturer to achieve a desired catalytic efficiency while minimizing waste from coating excess, expensive catalyst material on the substrate.

Cellular ceramic bodies absorb water due to the negative pressure (capillarity) developed in the body's pore structure. In a typical ceramic body used as a catalytic substrate, pores will vary widely in size and are interconnected with direct access to the surface of the body. Increasing or decreasing the total porosity will, in turn, increase or decrease water absorption, respectively.

Relatively minor changes in the raw materials (e.g., particle size or morphology of the precursor material) used in a cordierite body are known to influence the pore structure of the resultant body. Such changes in the precursor materials commonly occur from batch to batch. Over time, these minor changes can lead to a drift in the water absorption capability of the body. In the past, the drift has been corrected by adding an entirely new mineral compound to the batch composition. This compound is added as required to drive the water absorption back within acceptable limits.

Typically, compounds such as silica have been used for this purpose. However, silica has many disadvantages. It is very difficult to distribute silica uniformly in the batch due to the small amounts conventionally used. In addition, use of silica requires modifications in the amounts of other ingredients to maintain the proper analytical batch composition effective to produce a cordierite phase upon firing. Therefore, there is a need for procedures to adjust water absorption of cordierite bodies without the disadvantages discussed above.

SUMMARY OFT HE INVENTION

Is has been unexpectedly found, in accordance with the present invention, that the water absorption and shrinkage of cordierite bodies can be predictably adjusted by varying the relative amounts of two aluminas having different particle sizes. We have surprisingly discovered that there is a linear relationship between a cordierite body's water absorption capability and shrinkage and the percentage of the alumina-containing ingredients made up by two aluminas with different particle sizes.

Forming a cordierite body includes the steps of blending magnesia-yielding, alumina-yielding, and silica-yielding ingredients suitable to form an analytical batch composition by weight on an oxide basis of 9–20 weight percent MgO, 30–50 weight percent $Al_2O_3$, and 41–56.5 weight percent $SiO_2$, with an effective amount of vehicle and forming aids to form a plastic mixture. The plastic mixture is then formed into a green body. The green body is dried and then fired at a temperature and for a time effective to form a cordierite-containing body.

In the process of forming cordierite-containing bodies, the present invention provides a method for controlling the cordierite-containing body's water absorption and shrinkage which includes the steps of providing alumina-yielding ingredients in the form of an alumina of a first particle size and an alumina of a second particle size. The ratio of the-first particle size to the second particle size is in the range of from about 3:1 to 30:1 or 1:3 to 1:30. Next, a linear relationship is determined between the cordierite-containing body's water absorption capability and shrinkage, respectively, and the percentage of the alumina-yielding ingredients made up by the alumina of the first particle size and the alumina of the second particle size. Then, a water absorption capability or degree of shrinkage, respectively, of the cordierite-containing body is selected, in accordance with linear relationship, by adjusting the relative percentages of the alumina of the first particle size and the alumina of the second particle size.

The method of the present invention provides a way to predictably control the water absorption and/or shrinkage of a cordierite-containing body. The present method does not require the addition of any different mineral ingredients. The present method avoids the disadvantages of other methods of water absorption and/or shrinkage control that require new ingredients like silica. The present method solves problems relating to material distribution in the batch, and obviates the need to make additional formulation adjustments to the batch to maintain the correct stoichiometry to produce cordierite upon firing. In addition, once the linear relationship has been established, future adjustments can be made without further experimentation. This allows quicker, more predictable water absorption or shrinkage adjustments over a wide range than other methods of controlling water absorption and shrinkage in cordierite bodies.

DETAILED DESCRIPTION OF THE INVENTION

Figure 1:
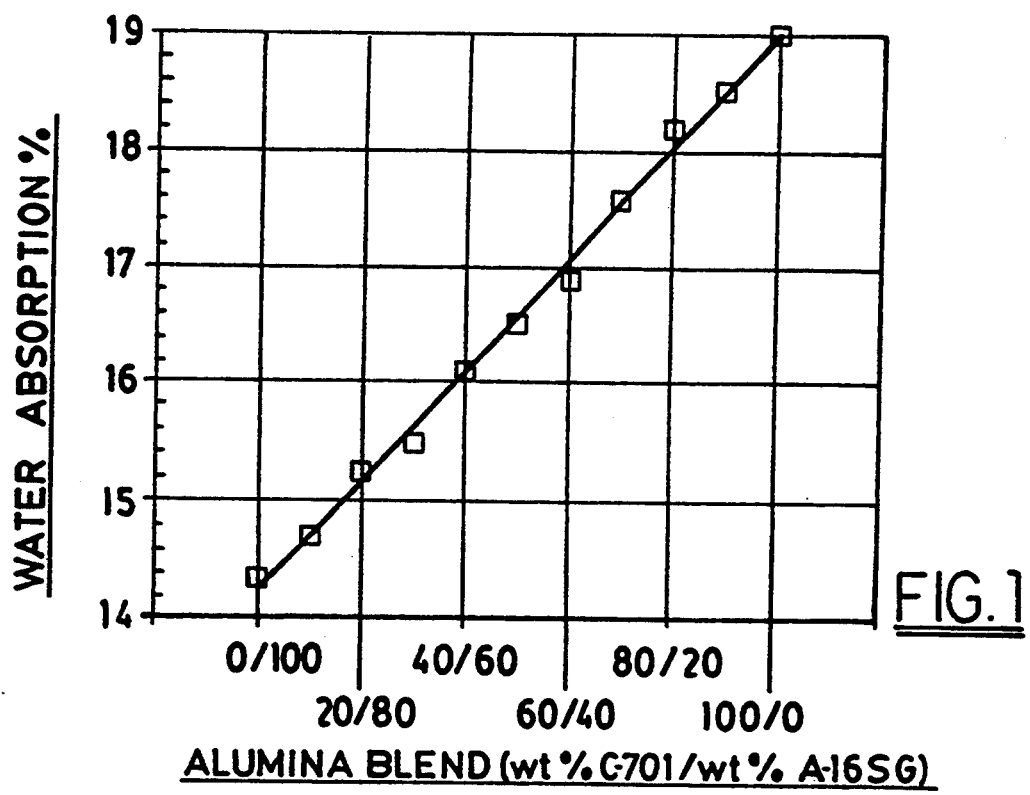
FIGS. 1 and 3 are graphs illustrating the linear relationship between the relative percentages of two aluminas having different particle sizes in a specific raw material composition and the water absorption of cordierite bodies made from that raw material composition.

The present invention relates to a process of forming cordierite-containing bodies and, more particularly, to a process of controlling water absorption and/or shrinkage in cordierite-containing bodies. A typical process for forming cordierite-containing bodies comprises the steps of blending magnesia-yielding ingredients, alumina-yielding ingredients, and silica-yielding ingredients suitable to form an analytical batch composition which forms cordierite on firing with an effective amount of vehicle and forming aids to form a plastic mixture. A cordierite-containing ceramic article or body will typically be 41–56.5 weight percent $SiO_2$, 30–50 weight percent $Al_2O_3$, and 9–20 weight percent $MgO$. The plastic mixture is formed into a green body which is dried and then fired at a temperature and for a time effective to form a cordierite-containing body. Preferably the total weight $MgO$, $Al_2O_3$, and $SiO_2$ is at least about 95 percent of the entire weight of the cordierite-containing body.

The present invention more particularly relates to an improvement in the above-described process which comprises a method of controlling the water absorption and/or shrinkage in the cordierite-containing body. The process of controlling the water absorption and/or shrinkage includes the steps of providing the alumina-yielding ingredients in the form of two different aluminas, each having a different particle size. The ratio of the particle sizes of the two aluminas should generally be in the range of from about 3:1 to 30:1 or 1:3 to 1:30. In accordance with the present invention, we have discovered that a linear relationship between a cordierite-containing body's water absorption capability and the percentage of alumina-yielding ingredients made up by the two aluminas having different particle sizes exists. In addition, a similarly linear relationship exists between a cordierite containing body's shrinkage and the percentage of alumina-yielding ingredients made up by the two aluminas having different particle sizes. After this linear relationship is determined, a water absorption capability or degree of shrinkage, respectively, of the cordierite-containing body is selected in accordance with the linear relationship by adjusting the relative percentages of each of the aluminas' different particle sizes. Any future water absorption or shrinkage adjustments to cordierite-containing bodies having the same raw material composition can, of course, be made in accordance with this same linear relationship.

The process of the present invention is particularly suitable for making structures having an extruded honeycomb configuration with a matrix of thin walls forming a multiplicity of open-ended cells. The cells extend from one end of the honeycomb to the other, and the thin walls have a substantially smaller coefficient of thermal expansion in the direction parallel to the axes of the open-ended cells than transverse to the thin walls. Such articles and their production are fully disclosed in U.S. Pat. No. 3,885,977 to Lachman et al., which is hereby incorporated by reference.

The crystals of cordierite, treated in accordance with the present invention, become preferentially oriented during the firing process. This is accomplished by the use of raw materials in the form of flat, planar particles (i.e., platelets) rather than large isodimensional particles. Suitable platey materials are found in various talcs and delaminated clays, such as delaminated kaolin.

The term platelet refers to the shape and geometry of a particle of material. The particle has two long dimensions and one short dimension—i.e. the length and width of the platelet are much larger than its thickness. The length and width need not be equal, but they must be much greater than the thickness of the platelet.

The mixture of raw materials is blended with water and extrusion aids to achieve sufficient plastic flow to orient the platelets properly. Extrusion aids, such as methylcellulose and sodium stearate, are added to give the mixture formability and green strength prior to firing. Water, which also aids plastic formability, should be utilized at a level of about 15 to 36% based on the weight of dry material.

Once a blend of raw materials in a plastically formable state is prepared, it can be subjected to a plastic flow or extrusion step which orients clay and talc platelets in the green ware. In forming structures with thin web and thin ribbon material, the desired orientation of clay and talc platelets is in the plane of the webs. Other forming methods such as rolling and pressing of sheets, which maybe assembled into honeycomb structures, can similarly be produced with a favorable orientation.

In conventional isostatic forming methods, clay and talc particles of the batch tend to be left in the same orientation imparted during mixing and preforming preparation. By contrast, the preferred anisostatic method does not apply equal forces to all parts of the body being formed, and, therefore, the clay and talc platelets are caused to slip and rotate in the plastic batch while trying to reach a planar orientation. In pressing or extruding a ribbon of material, for example, the orientation results in an ideal configuration of the c-axis of the clay. The resulting cordierite crystals are oriented, after firing, to have the low expansion c-axes lying preferentially in the plane of the ribbon and the high expansion a-axes oriented transverse to that plane and parallel to the thin dimension.

Preferably, the open celled, thin walled cordierite honeycomb structure is oriented to have a low expansion along the axes of the cells and a high expansion across the thin wall (but not across the entire body normal to the cell axis). The effect of the high expansion direction is minimal, because the internal spaces in honeycomb allow expansion of the thin walls into the cells. A typical honeycomb structure useful with the present invention has a wall thickness of between about 0.076 millimeters to 1.27 millimeters with cell densities of about 1.4 to about 144 cells/square centimeter. The thickness of the thin walls is not critical for achieving proper orientation, but thinner walls enable more complete and more consistent planar orientation.

The formed green body is dried. The body may be dried by any conventional method such as hot-air drying or dielectric drying. Dielectric drying is preferred.

Besides honeycomb structures, other shapes can be extruded or otherwise formed, and the anisotropy of the expansion will be controlled by the orientation imparted to the clay platelets during forming.

The firing range for the formed cordierite body should be from about 1340°–1440° C. with a soak time sufficient to yield a substantially complete reaction to the cordierite phase. Soak times of 6 to 12 hours may be used. The resulting fired body is, preferably, at least about 95% by weight cordierite.

The overall porosity of the formed cordierite body can vary as desired, but preferably is less than about 45, most preferably about 30, percent.

As stated above, the process of the present invention relates to controlling the water absorption and/or shrinkage of cordierite-containing bodies by using alumina-yielding ingredients in the form of two aluminas having different particle sizes. The percentage of the alumina-yielding ingredients made up by the two aluminas is linearly related to both the cordierite body's water absorption capability and shrinkage. Therefore, once the linear relationships between the body's water absorption capability and shrinkage, respectively, and the percentage of the respective aluminas making up the alumina-yielding ingredients is established, the water absorption capability or degree of shrinkage of the cordierite-containing body can be easily set by simply adjusting the relative percentages of the two aluminas in accordance with the appropriate linear relationship. This is particularly useful in manufacturing processes, where minute formula changes (e.g., change in particle size or morphology) can occur between batches of raw materials and cause profound changes in water absorption and/or shrinkage. Using the present method, the water absorption or shrinkage can be adjusted without further, additional adjustments to the batch composition. Also, the present process dispenses with the need for time consuming and expensive trial-and-error experimentation each time a cordierite-containing body's water absorption capability or degree of shrinkage must be adjusted.

Aluminas useful in the present method generally possess a particle size distribution minus 325 mesh (U.S. Standard Sieve). The aluminas used in the present method must have different particle sizes. The magnitude of the difference in the particle sizes of the two aluminas can be virtually any amount in the range of about 3:1 to 30:1 or, conversely, 1:3 to 1:30. Preferably, the alumina with a larger particle size has a particle size at least about 10 times larger than the smaller particle size as determined by measuring the diameter of the particles.

The linear relationships between the percentage of the two aluminas and the body's water absorption capability or shrinkage, respectively, can be determined by any conventional method. The relationship can be determined experimentally by preparing a single dry mixture including the magnesia-yielding and silica-yielding ingredients without the alumina-yielding ingredients. Next, a plurality of alumina blends are prepared. Each of the individual blends in the plurality of alumina blends should contain a different percentage ratio of the alumina of a first particle size and the alumina of a second particle size. Preferably, one blend contains 0 weight percent of the first alumina (100 weight percent of the second alumina), while another blend has 100 weight percent of the first alumina (0 weight percent of the second alumina) to provide the widest range for determining the linear relationship. Then, each of the plurality of alumina blends is added to a portion of the dry mixture (as the alumina-yielding ingredient) to form a plurality of dry mixtures suitable to form cordierite-containing bodies upon firing.

The plurality of dry mixtures are each then blended with an effective amount of vehicle and/or forming aids to form a plurality of plastic mixtures. Each of the plurality of plastic mixtures is formed into a green body which is dried and fired at a temperature and for a time effective to form a plurality of cordierite-containing bodies. The water absorption and/or shrinkage of each body is then determined and plotted relative to the ratio percentage of the alumina-yielding ingredients made up by the aluminas of a first and second particle size. This procedure will yield linear plots that can be easily used to determine what percentage ratio of the alumina-yielding ingredients will yield a specific water absorption capability or degree of shrinkage, respectively, for a cordierite body made from a specific raw material composition. Therefore, in practice, the water absorption capability or degree of shrinkage can be predictably adjusted by changing the relative percentages of the two aluminas (e.g., increasing or decreasing the amount of either the relatively coarse alumina or the relatively fine alumina).

The linear relationships produced in accordance with the above-described process will be specific for the particular cordierite body produced. It is well known that cordierite-containing bodies can be produced using a variety of ingredients. Therefore, new linear relationships should be established for each different formulation used to produce a cordierite-containing body. For the purposes of the present invention, a new formulation is when a different generic component is added to or substituted in an existing formula.

The present invention is further illustrated by the following non-limiting examples.

EXAMPLES

EXAMPLE 1

A grandfather batch was prepared having the following composition shown in Table I below, wherein weight percent is represented by "wt. %" and mean particle size is represented as "mps":

TABLE I

| Component | wt % | mps (μm) |
| --- | --- | --- |
| 95-27 TM Talc (Pfizer, Inc.) | 40.75 | 6.8 |
| DBK Glomax TM (Dry Branch Kaolin) | 30.77 | 1.2 |
| Kaopaque-10 TM (Dry Branch Kaolin) | 14.80 | 1.8 |

The alumina-containing ingredients were not included. The grandfather batch was mixed in a 50 liter Littleford mixer, sold by Littleford Bros., Inc., Florence, Ky.

Alumina blends were then prepared in which 0, 10, 20, 30, 40, 50, 60, 70, 80, 90, and 100 weight percent of A-16SG TM, a fine alumina having an average particle size of about 0.6 μm (sold by Alcoa) was substituted with C701 TM, a coarse alumina having an average particle size of about 6 μm, (sold by Alcan, Inc., New York, N.Y.). The alumina blends were mixed in a Turbula mixer, (sold by WAB, Inc., Basel, Switzerland), for 30 minutes. 34.75 g of each alumina blend was added to a portion of the grandfather batch to provide ten 254 g dry batches. The alumina blend comprised 13.68 wt. % of the 254 g total of each of the ten 15 batches. The ten dry batches were separately homogenized for 15 minutes on a Turbula mixer. Water was added to each dry batch to provide ten 325 g mixtures of powder and water. The powder/water mixtures were added to a torque rheometer and mixed for about six minutes to form a plasticized batch.

The plasticized batch was transferred to a small piston extruder attached to an Instron Universal Testing Machine (sold by Instron, Inc., Canton, Mass.). The material was next extruded as 0.635 cm rods from which 2.54 cm diameter, 31 cells/cm² cellular samples were produced. The extruded cellular samples were fired in a Bickley 3000 kiln, (sold by Bickley Furnaces, Philadelphia, Pa.), according to the schedule below:

25—200° C. in 2.0 hours;
200—325° C. in 5.0 hours;
325—450° C. in 2.5 hours;
450—600° C. in 6.5 hours;
600—900° C. in 3.0 hours;
900—1100° C. in 4.0 hours;
1100—1130° C. in 2.0 hours;
1130—1160° C. in 2.0 hours;
1160—1265° C. in 4.0 hours;
1265—1320° C. in 3.0 hours;
1320—1390° C. in 6.0 hours;
Hold @1390° C. for 8.0 hours;
1390—650° C. in 8.0 hours;
650—100° C. in 5.0 hours.

The fired samples were evaluated for water absorption, coefficient of thermal expansion, shrinkage, modulus of rupture, and porosity. Water absorption was measured using a boiling water technique in which an Archimedes-style weight measurement was made to quantify the water pick-up of the ceramic body after boiling the part in water for at least thirty minutes. Shrinkage measured was radial shrinkage perpendicular to the direction of extrusion as measured before and after drying and before and after firing. The coefficient of thermal expansion was measured between 25° and 800° C. using a standard thermal expansion dilatometer. Modulus of rupture was measured by a standard 4-point bend technique. Porosity was determined by standard mercury porosity measurement methods and is presented below in terms of total mercury penetration.

The experimental details and results are set forth in Table II below and plotted in FIGS. 1 and 2.

TABLE II

| C701 (%) | WATER ABS. (%) | CTE × 10⁷/CM | POROSITY (ml/g) | DRY (%) | SHRINKAGE FIRED (%) | TOTAL (%) |
| --- | --- | --- | --- | --- | --- | --- |
| 0 | 14.32 | 2.3 | 0.1463 | 2.47 | 7.28 | 9.09 |
| 10 | 14.69 | 2.2 | 0.1407 | 2.32 | 7.19 | 8.80 |
| 20 | 15.24 | 2.5 | 0.1457 | 1.64 | 7.20 | 8.06 |
| 30 | 15.47 | 2.6 | 0.1454 | 1.68 | 6.89 | 7.81 |
| 40 | 16.07 | 2.9 | 0.1567 | 1.62 | 6.77 | 7.61 |
| 50 | 16.49 | 2.7 | 0.1526 | 1.67 | 6.46 | 7.27 |
| 60 | 16.90 | 3.1 | 0.1601 | 1.30 | 6.24 | 6.43 |
| 70 | 17.62 | 3.3 | 0.1663 | 1.69 | 6.00 | 6.92 |
| 80 | 18.18 | 2.9 | 0.1779 | 1.87 | 5.75 | 6.86 |
| 90 | 18.53 | 3.5 | 0.1782 | 1.62 | 5.59 | 6.52 |
| 100 | 18.97 | 3.5 | 0.1782 | 1.62 | 5.13 | 6.15 |

Figure 2:
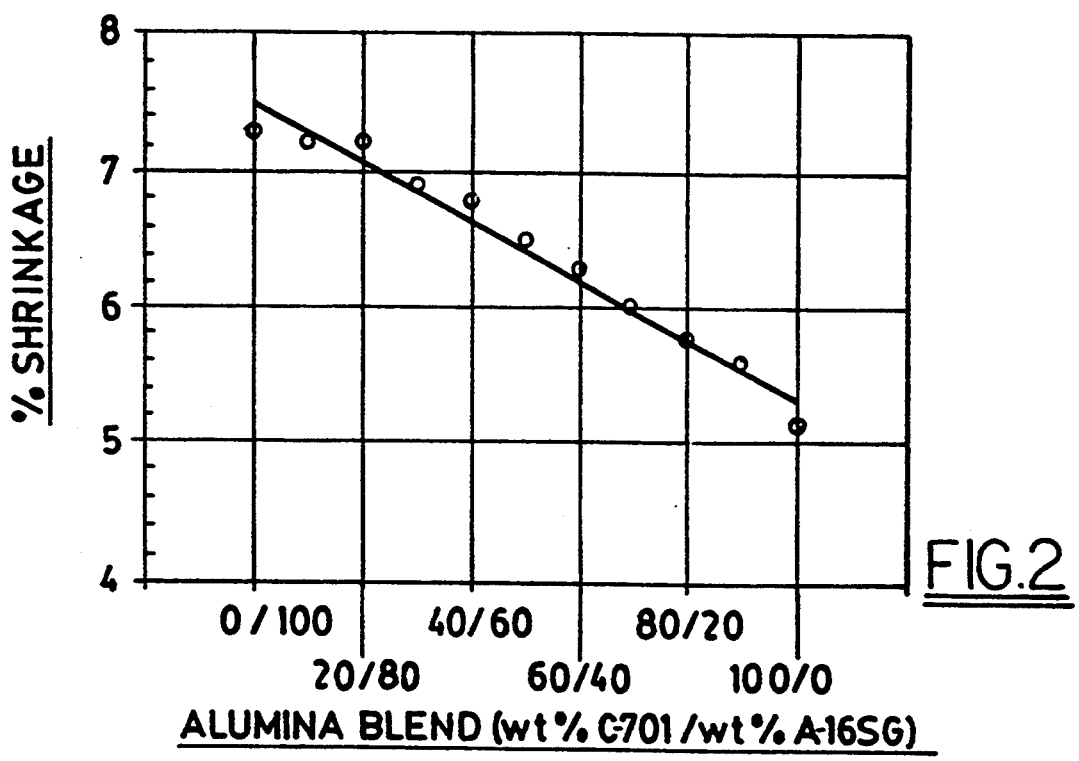
FIGS. 2 and 4 are graphs illustrating the linear relationship between the relative percentages of two aluminas having different particle sizes in a specific raw material composition and the shrinkage exhibited by cordierite bodies made from that raw material composition.

FIG. 1 clearly illustrates the linear relationship between the relative percentages of the two aluminas and the water absorption of the cordierite body over the entire range of blends. This linear relationship can be mathematically represented based on this plot according to the following formula: $y = 0.047782x + 14.2$, wherein y is the water absorption capability and x is the percentage of the alumina-yielding ingredients made up by either the alumina of a first particle size or the alumina of a second particle size. Likewise, FIG. 2 illustrates the linear relationship between the relative percentages of the two aluminas and the fired shrinkage of the cordierite body. This linear relationship can be mathematically represented based on this plot according to the following formula: $z = -0.021645x + 7.49$, wherein z is the degree of shrinkage and x is the percentage of the alumina-yielding ingredients made up by either the alumina of a first particle size or the alumina of a second particle size.

EXAMPLE 2

A grandfather batch was prepared having the following composition shown in Table III below, wherein weight percent is represented by "wt. %" and mean particle size is represented as "mps":

TABLE III

| Component | wt % | mps (μm) |
| --- | --- | --- |
| FCOR TM Talc (Luzenac, Inc.) | 40.75 | 9.2 |
| DBK Glomax TM (Dry Branch Kaolin) | 30.77 | 1.2 |
| Kaopaque-10 TM (Dry Branch | 14.80 | 1.8 |

TABLE III-continued

| Component | wt % | mps (μm) |
| --- | --- | --- |
| Kaolin) | | |

The alumina-containing ingredients were not included. The grandfather batch was mixed in a 50 liter Littleford mixer, sold by Littleford Bros., Inc., Florence, Ky.

Alumina blends were then prepared in which 0, 10, 20, 30, and 40 weight percent of C701 ™ alumina was substituted with A-16SG ™ alumina. Five samples were then prepared according to the procedure described in Example 1.

The fired samples were evaluated for water absorption, coefficient of thermal expansion, shrinkage, modules of rupture, and porosity as described above in Example 1.

The experimental details and results are set forth in Table IV below and plotted in FIGS. 3 and 4.

TABLE IV

| A16SG ™ (%) | WATER ABS. (%) | CTE × $10^7$/CM | POROSITY (ml/g) | DRY (%) | SHRINKAGE FIRED (%) | TOTAL (%) |
| --- | --- | --- | --- | --- | --- | --- |
| 0 | 19.88 | 3.4 | 0.1960 | 1.02 | 4.00 | 4.37 |
| 10 | 19.28 | 3.4 | 0.1909 | 1.29 | 4.17 | 4.92 |
| 20 | 18.97 | 3.1 | 0.1854 | 0.53 | 4.43 | 4.22 |
| 30 | 18.40 | 3.3 | 0.1796 | 1.25 | 4.52 | 4.68 |
| 40 | 17.93 | 2.6 | 0.1738 | 1.16 | 4.73 | 5.22 |

Figure 3:
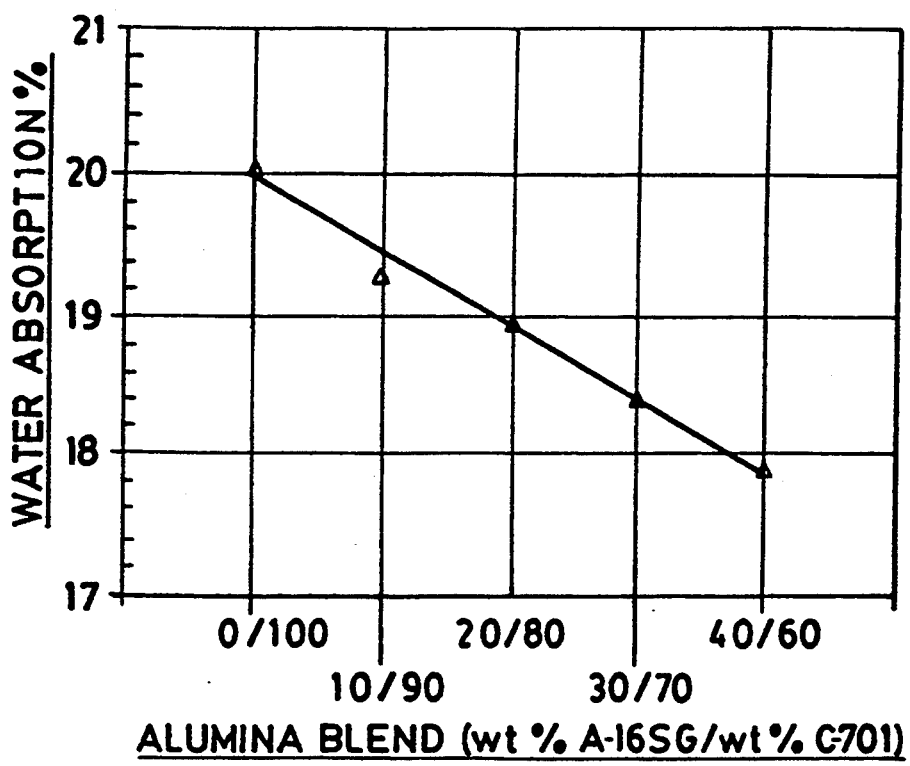
Figure 4:
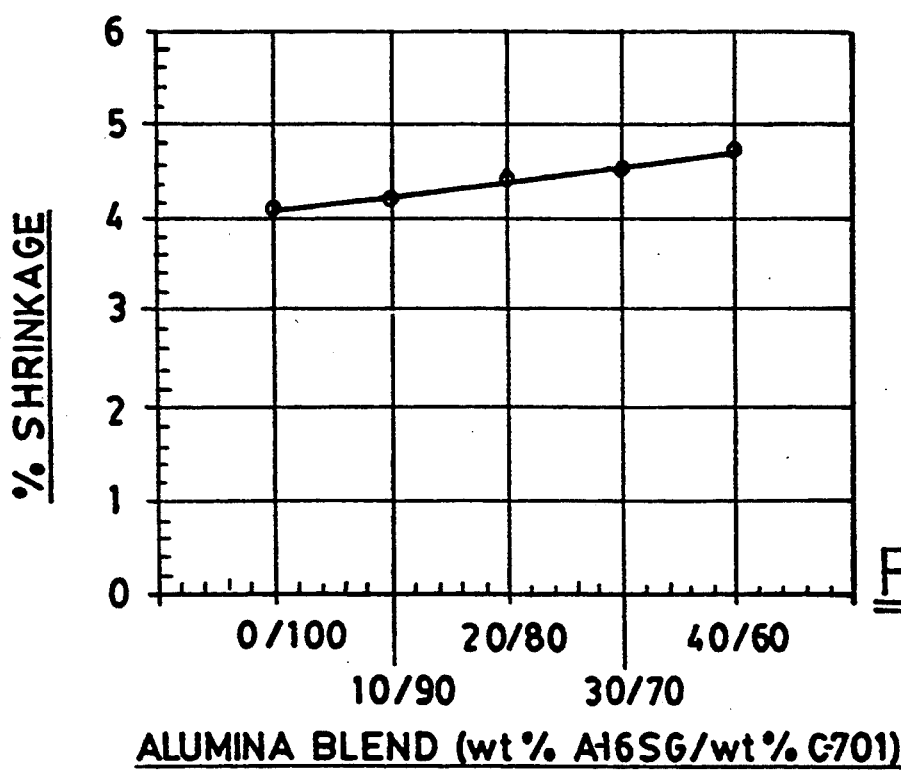

FIG. 3 clearly illustrates the linear relationship between the relative percentages of the two aluminas and the water absorption of the cordierite body over the entire range of blends. This linear relationship can be mathematically represented based on this plot according to the following formula: $y = -0.0514x + 19.96$, wherein y is the water absorption capability and x is the percentage of the alumina-yielding ingredients made up by either the alumina of a first particle size or the alumina of a second particle size. Likewise, FIG. 4 illustrates the linear relationship between the relative percentages of the two aluminas and the fired shrinkage of the cordierite body. This linear relationship can be mathematically represented based on this plot according to the following formula: $z = 0.0163x + 4.06$, wherein z is the degree of shrinkage and x is the percentage of the alumina-yielding ingredients made up by either the alumina of a first particle size or the alumina of a second particle size.

Although the invention has been described in detail for the purpose of illustration, it is understood that such detail is solely for that purpose, and variations can be made therein by those skilled in the art without departing from the spirit and scope of the invention which is defined by the following claims.

What is claimed is:

1. A process of forming cordierite-containing bodies comprising the steps of blending magnesia-yielding ingredients, alumina-yielding ingredients, and silica-yielding ingredients suitable to form an analytical batch composition by weight on an oxide basis of 9–20 weight percent MgO, 30–50 weight percent $Al_2O_3$, and 41–56.5 weight percent $SiO_2$, with an effective amount of vehicle and forming aids to form a plastic mixture, forming said plastic mixture into a green body, drying said green body, and firing the dried green body at a temperature and for a time effective to form a cordierite-containing body, wherein the improvement comprises:

controlling the water absorption capability in the cordierite-containing body by a process comprising:

providing said alumina-yielding ingredients in the form of an alumina of a first particle size and an alumina of a second particle size, wherein the ratio of said first particle size to said second particle size is in the range of about 3:1 to 30:1 or from about 1:3 to 1:30;

determining a linear relationship between said cordierite-containing body's water absorption capability and the percentage of alumina-yielding ingredients made up by said alumina of said first particle size and said alumina of said second particle size by determining the water absorption capability of a plurality of fired cordierite bodies each having a different ratio of said alumina of said first particle size and said alumina of said second particle size;

and selecting a water absorption capability of said cordierite-containing body, in accordance with said linear relationship by adjusting the relative percentages of said alumina of said first particle size and said alumina of said second particle size.

2. A process according to claim 1, wherein said determining a linear relationship includes the steps of:

preparing a dry mixture of said magnesia-yielding ingredients and said silica-yielding ingredients;

preparing a plurality of alumina blends, wherein each alumina blend contains a different ratio of said alumina of said first particle size and said alumina of said second particle size;

adding each of said plurality of alumina blends to a separate portion of said dry mixture to form a plurality of dry mixtures each suitable to form an analytical batch composition by weight on an oxide basis of 9–20 weight percent MgO, 30–50 weight percent $Al_2O_3$, and 41–56.5 weight percent $SiO_2$;

blending each of said plurality of dry mixtures with an effective amount of vehicle and forming aids to form a plurality of plastic mixtures;

forming said plurality of plastic mixtures into a plurality of green bodies;

drying said plurality of green bodies;

firing the plurality of dried green bodies at a temperature and for a time effective to form a plurality of cordierite-containing bodies;

determining a water absorption capability for each of said plurality of cordierite-containing bodies; and plotting the water absorption capability of each of said cordierite-containing bodies versus the percentage of the alumina-yielding ingredients made up by said alumina of said first particle size and said alumina of said second particle size of each said body to obtain the linear relationship.

3. A process according to claim 1, wherein said forming is by anisotropic extrusion.

4. A process according to claim 3, wherein said cordierite-containing body has a honeycomb configuration.

5. A process according to claim 1, wherein said cordierite-containing body has an overall porosity less than about 45%.

6. A process according to claim 5, wherein said cordierite-containing body has an overall porosity less than about 30%.

7. A process according to claim 1, wherein one of said aluminas is relatively fine and has a mean particle size less than about 1.0 micron and one of said aluminas is relatively coarse and has a mean particle size greater than about 5.0 microns.

8. A process according to claim 7, wherein said selecting includes increasing said percentage of said alumina of a relatively coarse particle size.

9. A process according to claim 7, wherein said selecting includes increasing said percentage of said alumina of a relatively fine particle size.

10. A process according to claim 1, wherein said magnesia-yielding ingredients include 40.75 wt. % talc having a mean particle size of about 6.8 μm, and said silica-yielding ingredients include 30.77 wt. % calcined clay having a mean particle size of about 1.2 μm, and 14.8 wt. % uncalcined clay having a mean particle size of about 1.8 μm.

11. A process according to claim 10, wherein
one of said aluminas has a mean particle size of about 6.0 microns and one of said aluminas has a mean particle size of about 0.6 microns and
said linear relationship is characterized by the equation:

$$y = 0.047782x + 14.2$$

wherein y is said water absorption capability and x is the percentage of the alumina-yielding ingredients made up by either said alumina of said first particle size or said alumina of said second particle size.

12. A process of forming cordierite-containing bodies comprising the steps of blending magnesia-yielding ingredients, alumina-yielding ingredients, and silica-yielding ingredients suitable to form an analytical batch composition by weight on an oxide basis of 9–20 weight percent MgO, 30–50 weight percent Al$_2$O$_3$, and 41–56.5 weight percent SiO$_2$, with an effective amount of vehicle and forming aids to form a plastic mixture, forming said plastic mixture into a green body, drying said green body, and firing the dried green body at a temperature and for a time effective to form a cordierite-containing body, wherein the improvement comprises:
controlling the shrinkage in the cordierite-containing body by a process comprising:
providing said alumina-yielding ingredients in the form of an alumina of a first particle size and an alumina of a second particle size, wherein the ratio of said first particle size to said second particle size is in the range of about 3:1 to 30:1 or from about 1:3 to 1:30;
determining a linear relationship between said cordierite-containing body's shrinkage and the percentage of alumina-yielding ingredients made up by said alumina of said first particle size and said alumina of said second particle size by determining the shrinkage of a plurality of fired cordierite bodies each having a different ratio of said alumina of said first particle size and said alumina of said second particle size; and
selecting a degree of shrinkage for said cordierite-containing body, in accordance with said linear relationship by adjusting the relative percentages of said alumina of said first particle size and said alumina of said second particle size.

13. A process according to claim 12, wherein said determining a linear relationship includes the steps of:
preparing a dry mixture of said magnesia-yielding ingredients and said silica-yielding ingredients;
preparing a plurality of alumina blends, wherein each alumina blend contains a different ratio of said alumina of said first particle size and said alumina of said second particle size;
adding each of said plurality of alumina blends to a separate portion of said dry mixture to form a plurality of dry mixtures each suitable to form an analytical batch composition by weight on an oxide basis of 9–20 weight percent MgO, 30–50 weight percent Al$_2$O$_3$, and 41–56.5 weight percent SiO$_2$;
blending each of said plurality of dry mixtures with an effective amount of vehicle and forming aids to form a plurality of plastic mixtures;
forming said plurality of plastic mixtures into a plurality of green bodies;
drying said plurality of green bodies;
firing the plurality of dried green bodies at a temperature and for a time effective to form a plurality of cordierite-containing bodies;
measuring each of said plurality of cordierite-containing bodies' degree of shrinkage; and
plotting said degree of shrinkage of each of said cordierite-containing bodies versus the percentage of said alumina-yielding ingredients made up by said alumina of said first particle size and said alumina of said second particle size of each said body to obtain the linear relationship.

14. A process according to claim 12, wherein said forming is by anisotropic extrusion.

15. A process according to claim 14, wherein said cordierite-containing body has a honeycomb configuration.

16. A process according to claim 12, wherein said cordierite-containing body has an overall porosity less than about 45%.

17. A process according to claim 16, wherein said cordierite-containing body has an overall porosity less than about 30%.

18. A process according to claim 12, wherein one of said first particle size or said second particle size is relatively fine and is less than about 1.0 micron and one of said first particle size or said second particle size is relatively coarse and is greater than about 5.0 microns.

19. A process according to claim 18, wherein said selecting includes increasing said percentage of said alumina of a relatively coarse particle size.

20. A process according to claim 18, wherein said selecting includes increasing said percentage of said alumina of a relatively fine particle size.

21. A process according to claim 12, wherein said magnesia-yielding ingredients include 40.75 wt. % talc having a mean particle size of about 6.8 μm, and said silica-yielding ingredients include 30.77 wt. % calcined clay having a mean particle size of about 1.2 μm, and 14.8 wt. % uncalcined clay having a mean particle size of about 1.8 μm.

22. A process according to claim 21, wherein one of said aluminas has a mean particle size of about 6.0 microns and one of said aluminas has a mean particle size of about 0.6 microns and said linear relationship is characterized by the equation:

$$z = -0.021645x + 7.4914$$

wherein z is said degree of shrinkage and x is the percentage of the alumina-yielding ingredients made up by either said alumina of said first particle size or said alumina of said second particle size.

* * * * *